United States Patent
Kim et al.

(10) Patent No.: US 12,451,557 B2
(45) Date of Patent: Oct. 21, 2025

(54) GAS REMOVING DEVICE AND METHOD FOR REMOVING GAS FROM A POUCH TYPE CASE OF A SECONDARY BATTERY

(71) Applicant: LG Energy Solution, Ltd., Seoul (KR)

(72) Inventors: Sang Jih Kim, Daejeon (KR); Joon Sung Bae, Daejeon (KR); Eui Kyung Lee, Daejeon (KR); Suk Hyun Hong, Daejeon (KR); Beom Koon Lee, Daejeon (KR); Dong Hun Bae, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 629 days.

(21) Appl. No.: 17/792,831

(22) PCT Filed: Sep. 16, 2021

(86) PCT No.: PCT/KR2021/012721
§ 371 (c)(1),
(2) Date: Jul. 14, 2022

(87) PCT Pub. No.: WO2022/065808
PCT Pub. Date: Mar. 31, 2022

(65) Prior Publication Data
US 2023/0045436 A1    Feb. 9, 2023

(30) Foreign Application Priority Data

Sep. 25, 2020  (KR) .................. 10-2020-0125156
Sep. 16, 2021  (KR) .................. 10-2021-0123701

(51) Int. Cl.
*H01M 50/317*    (2021.01)
*H01M 50/308*    (2021.01)
*H01M 50/358*    (2021.01)

(52) U.S. Cl.
CPC ....... *H01M 50/317* (2021.01); *H01M 50/308* (2021.01); *H01M 50/358* (2021.01); *Y02E 60/10* (2013.01); *Y02P 70/50* (2015.11)

(58) Field of Classification Search
CPC ............. H01M 50/317; H01M 50/358; H01M 50/308; Y02P 70/50; Y02E 60/10
See application file for complete search history.

(56) References Cited

U.S. PATENT DOCUMENTS

| 2010/0028772 | A1 | 2/2010 | Yang et al. | |
| 2013/0244095 | A1* | 9/2013 | Min ................... | H01M 50/103 429/185 |

(Continued)

FOREIGN PATENT DOCUMENTS

| CN | 103354961 A | 10/2013 |
| CN | 205452450 U | 8/2016 |

(Continued)

OTHER PUBLICATIONS

KR102124201 (B1) Kim machine translation to English (Year: 2025).*

(Continued)

*Primary Examiner* — Maria Laios
*Assistant Examiner* — Lawrence La Raia, III
(74) *Attorney, Agent, or Firm* — Lerner David LLP

(57) ABSTRACT

The present invention provides a gas removing device, which removes a gas generated inside a pouch, in which an electrode assembly is accommodated. The gas removing device includes a pair of vacuum tubes configured to press opposing surfaces of a pouch so as to form a vacuum surface on the pouch; a heating member provided on a pressing surface of each of the vacuum tubes, which presses the pouch, is configured to seal only a portion of an edge of the vacuum surface so as to form a sealed part and an unsealed (Continued)

part; a cutting member configured to cut the vacuum surface of the pouch and form a cutoff hole; and a gas discharging member configured to discharge a gas from inside the pouch to the outside through the unsealed part, the cutoff hole, and the vacuum tubes.

12 Claims, 15 Drawing Sheets

(56) References Cited

U.S. PATENT DOCUMENTS

| | | |
|---|---|---|
| 2015/0270530 A1 | 9/2015 | Thoennessen et al. |
| 2019/0207183 A1 | 7/2019 | Park et al. |
| 2019/0207241 A1 | 7/2019 | Park et al. |
| 2020/0185675 A1 | 6/2020 | Lee et al. |
| 2020/0373631 A1 | 11/2020 | Son et al. |

FOREIGN PATENT DOCUMENTS

| | | |
|---|---|---|
| CN | 206541894 U | 10/2017 |
| CN | 108808141 A | 11/2018 |
| JP | 2001052664 A | 2/2001 |
| JP | 2018006224 A | 1/2018 |
| KR | 20080011477 A | 2/2008 |
| KR | 20150045097 A | 4/2015 |
| KR | 20170104205 A | 9/2017 |
| KR | 20180062835 A | 6/2018 |
| KR | 20180062839 A | 6/2018 |
| KR | 20190055585 A | 5/2019 |
| KR | 20190055595 A | 5/2019 |
| KR | 20190074591 A | 6/2019 |
| KR | 20200026064 A | 3/2020 |
| KR | 20200033665 A | 3/2020 |
| KR | 102124201 B1 | 6/2020 |
| WO | 2020145490 A1 | 7/2020 |

OTHER PUBLICATIONS

CN206541894 (U) Ye Machine translation to English (Year: 2025).*
YE figure 1 CN206541894 (U)zoom from Chinese Patent database (Year: 2025).*
YE figure 1 and 2 CN206541894 (U)from Chinese Patent database (Year: 2025).*
YE figure 3 4 and 5 from Chinese Patent CN206541894 (U) database (Year: 2025).*
Extended European Search Report including Written Opinion for Application No. 21872836.8 dated Jun. 18, 2024 , pp. 1-9.
International Search Report for Application No. PCT/KR2021/012721 mailed Dec. 28, 2021, 2 pages.

* cited by examiner

GAS REMOVING DEVICE AND METHOD FOR REMOVING GAS FROM A POUCH TYPE CASE OF A SECONDARY BATTERY

CROSS-REFERENCE TO RELATED APPLICATION

The present application is a national phase entry under 35 U.S.C. § 371 of International Application No. PCT/KR2021/012721, filed on Sep. 16, 2021, and claims the benefit of the priority of Korean Patent Application Nos. 10-2020-0125156, filed on Sep. 25, 2020, and 10-2021-0123701, filed on Sep. 16, 2021, which are hereby incorporated by reference in their entirety.

TECHNICAL FIELD

The present invention relates to a gas removing device and method of a secondary battery, and more particularly, to a gas removing device and method of a secondary battery, in which a process of removing a gas generated in a pouch and a process of sealing a hole through which the gas is discharged are performed at the same time.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

The secondary batteries are classified into a can type secondary battery, in which an electrode assembly is embedded in a metal can, and a pouch type secondary battery in which an electrode assembly is embedded in a pouch. Also, the pouch type secondary battery comprises an electrode assembly, an electrode lead coupled to an electrode tab of the electrode assembly, and a pouch accommodating the electrode assembly in a state in which a front end of the electrode lead is drawn out.

In the secondary battery, an activation process of charging and discharging the secondary battery to improve battery performance, a degassing process of discharging a gas generated inside the secondary battery during the activation process, a sealing process of sealing a gas discharge hole of the secondary battery are performed.

However, since the secondary battery according to the related art performs the degassing process and the sealing process in separate devices, there is a problem in that work efficiency is deteriorated.

DISCLOSURE OF THE INVENTION

Technical Problem

In a gas removing device and method of a secondary battery according to the present invention for solving the above problems, a gas generated in the secondary battery is discharged, and continuously, a hole, through which the gas is discharged, is sealed to improve work efficiency.

Technical Solution

A gas removing device, which removes a gas generated inside a pouch, in which an electrode assembly is accommodated, according to the present invention for achieving the above object comprises: a pair of vacuum tubes configured to symmetrically press opposing surfaces of a pouch so as to form a vacuum surface; a heating member provided on a pressing surface of each of the vacuum tubes, which presses the pouch, is configured to seal only a portion of an edge of the vacuum surface so as to form a sealed part and an unsealed part; a cutting member configured to cut the vacuum surface of the pouch and form a cutoff hole; and a gas discharging member configured to discharge a gas from inside the pouch to the outside through the unsealed part, the cutoff hole, and the vacuum tubes.

In the heating member, two or more vacuum tubes may be provided on the pressing surface to form two or more sealed parts and two or more unsealed parts on the edge of the vacuum surface.

An arc angle formed by combining the two or more heating members may be 180° or more based on a central point of the vacuum tube.

Two heating members may be symmetrically provided on the pressing surface based on a central point of the vacuum tube, and each of the two heating member may have an arc angle of 90° or more based on the central point of the vacuum tube.

An insulator configured to block heat of the heating member so as not to be transferred to the unsealed part may be provided on the pressing surface of the vacuum tube disposed between the heating members.

An insertion groove into which the heating member and the insulator are inserted and fixed may be formed in the pressing surface of the vacuum tube.

The pressing surface of the vacuum tube may have a ring shape, the insertion groove may be formed along the pressing surface so that each of both ends of the insertion groove is ring shaped, and the heating member and the insulator may be inserted to be alternately disposed in the insertion groove having the ring shape.

The heating member and the insulator may be detachably inserted into the insertion groove.

The gas removing device may further comprise a rotating member configured to rotate the pair of vacuum tubes so that the heating member provided in each of the pair of vacuum tubes is disposed on the unsealed part.

The heating member disposed on the unsealed part may be provided to seal the unsealed part so as to seal the cutoff hole.

A gas removing method of a secondary battery, in which a gas generated inside a pouch, in which an electrode assembly is accommodated, is removed, according to the present invention comprises: a process (a) of symmetrically pressing opposing surfaces of a pouch to form a vacuum surface, which is in a vacuum state, on a surface of the pouch; a process (b) of sealing only a portion of an edge of the vacuum surface through a heating member provided on the pressing surface of the vacuum tube that presses the pouch to form a sealing part and an unsealed part; a process; (c) of cutting the vacuum surface of the pouch by using a cutting member to form a cutoff hole; and a process (d) of discharging a gas inside the pouch through a gas discharge member to the outside through the unsealed part, the cutoff hole, and the vacuum tubes.

In the process (b), two or more heating members may be provided to form two or more sealed parts and two or more unsealed parts on the edge of the vacuum surface.

In the process (b), an arc angle formed by combining the two or more heating members may be equal to or greater than 180° based a central point of the vacuum tube to form a sealed part having a combined arc angle of 180° or more on the edge of the vacuum surface.

The gas removing method may further comprise, after the process (d), a process (e) of rotating the vacuum tube through a rotating member so that the heating member provided on the vacuum tube is disposed on the unsealed part; and a process (f) of sealing the unsealed part through the heating member to seal the cutoff hole.

In the process (e), both ends of the heating member disposed on the unsealed part may be disposed to partially overlap the sealed part disposed on both sides of the unsealed part.

Advantageous Effects

The gas removing device of the secondary battery may comprise the pair of vacuum tubes, the heating member, the cutting member, the gas discharging member, and the rotating member. Due to these characteristics, it is possible to simultaneously performing the discharging of the gas generated inside the secondary battery and the sealing of the discharging hole, through which the gas is discharged, and as a result, the work efficiency and the process simplification may be improved.

MODE FOR CARRYING OUT THE INVENTION

Figure 1:
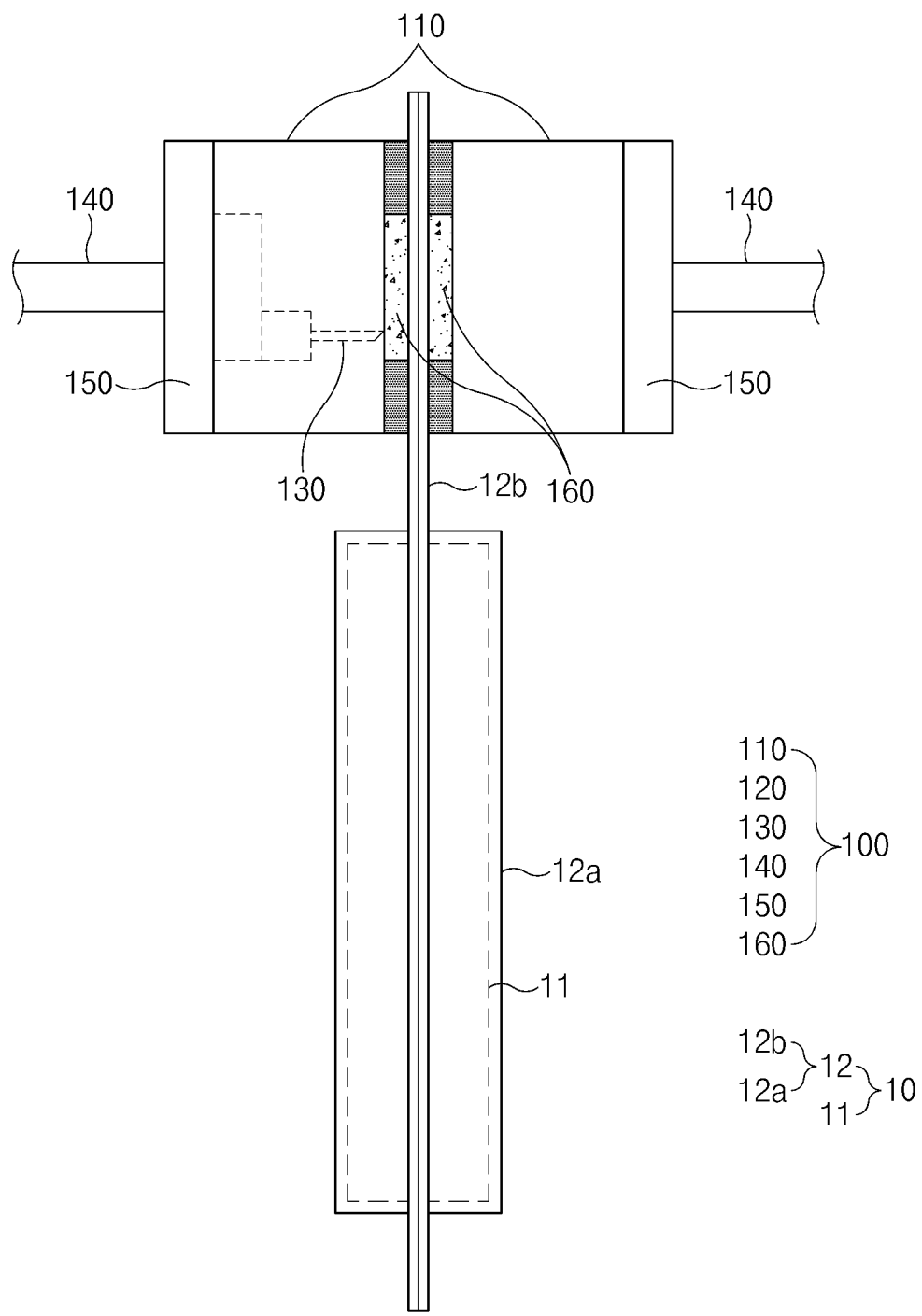
FIG. 1 is a side view illustrating a gas removing device of a secondary battery according to a first embodiment of the present invention.
Figure 2:
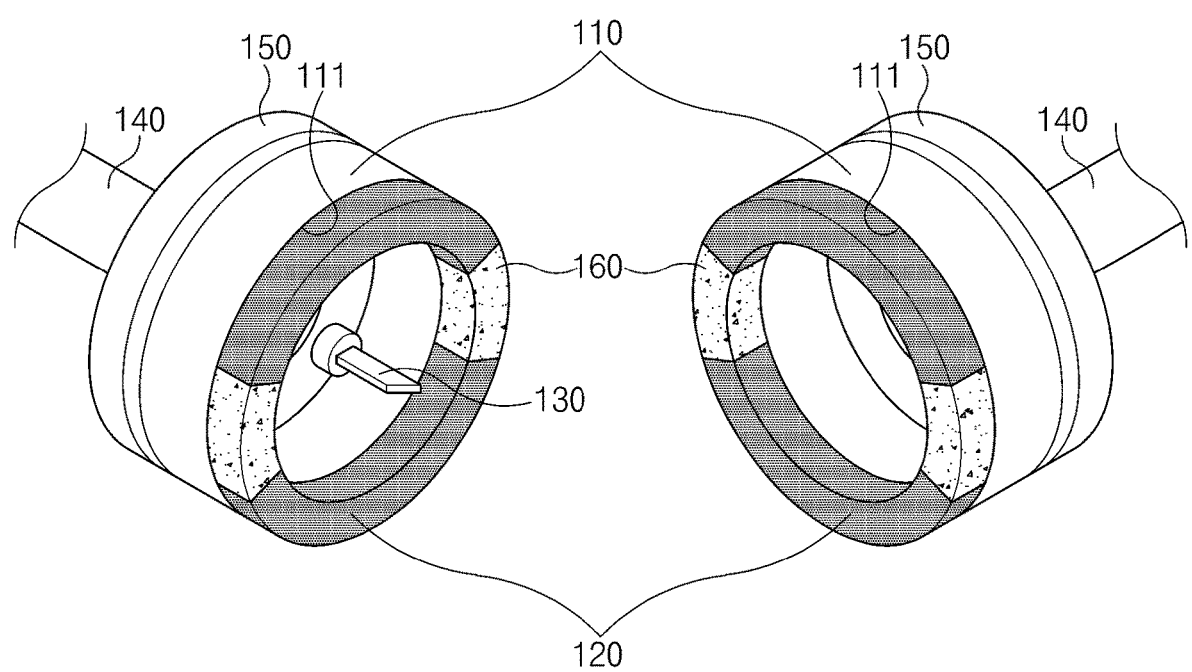
FIG. 2 is a perspective view illustrating the gas removing device of the secondary battery according to the first embodiment of the present invention.
Figure 3:
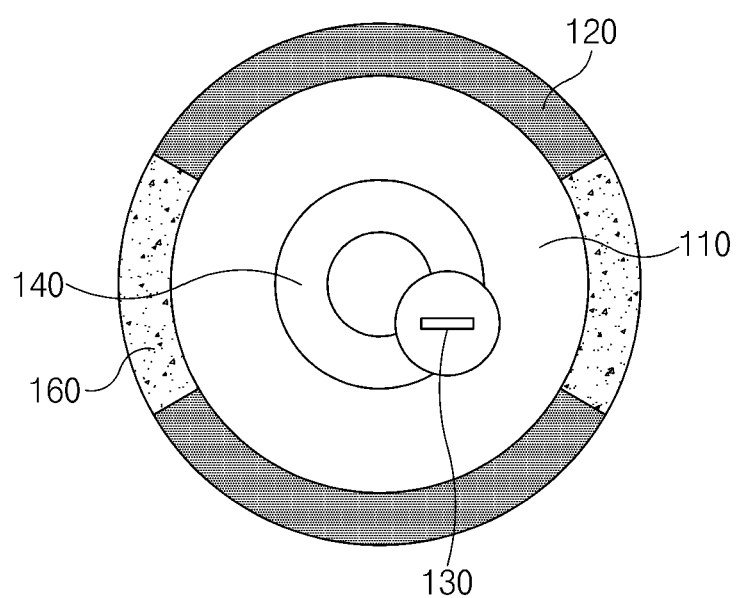
FIG. 3 is a front view illustrating one vacuum tube in the gas removing device of the secondary battery according to the first embodiment of the present invention.
Figure 4:
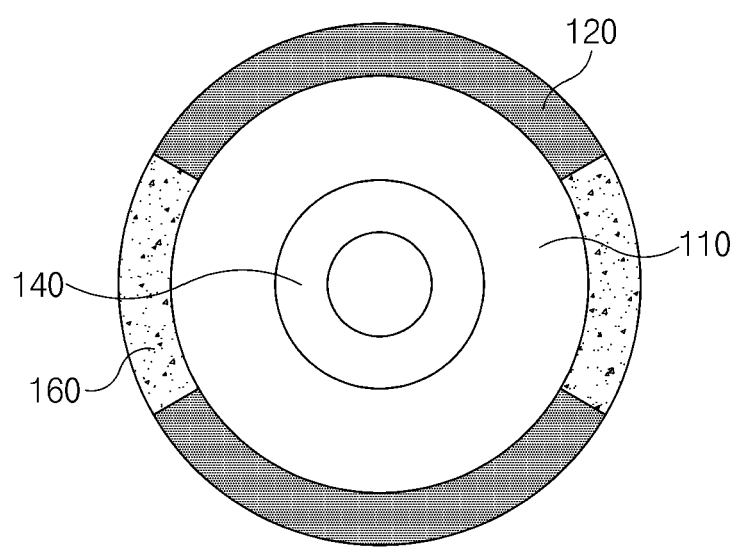
FIG. 4 is a front view illustrating the other vacuum tube in the gas removing device of the secondary battery according to the first embodiment of the present invention.
Figure 5:
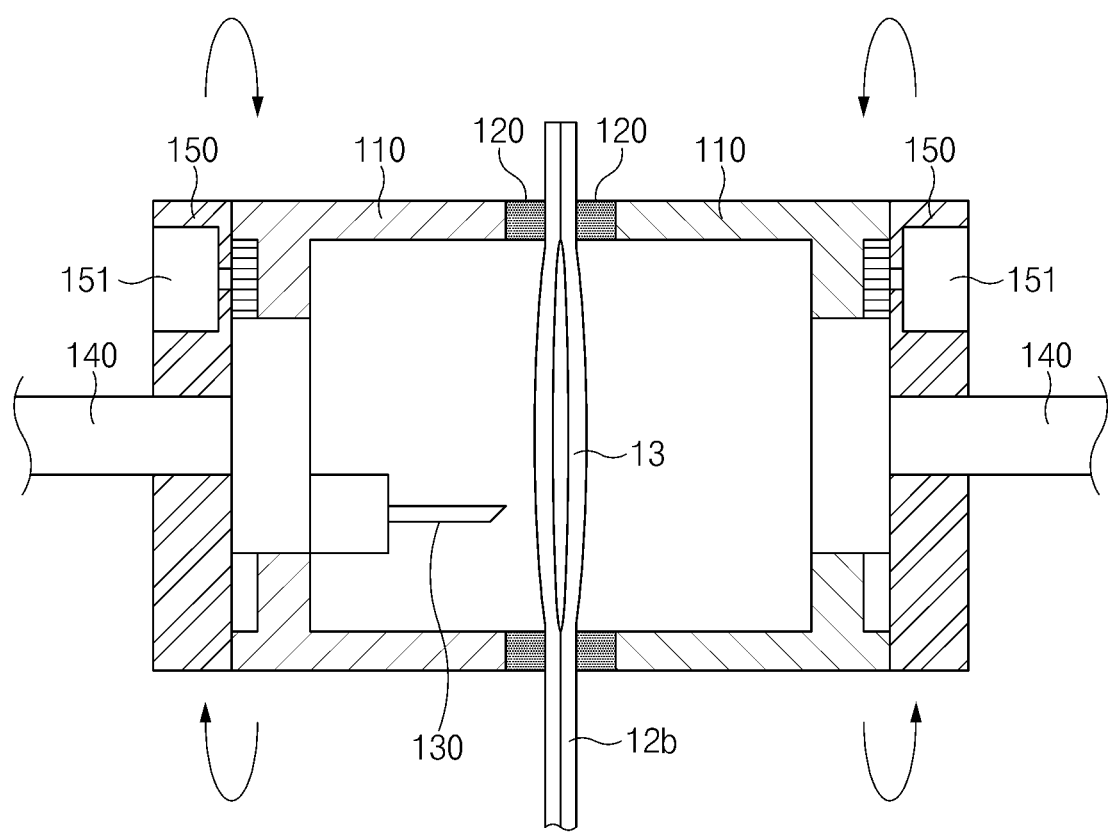
FIG. 5 is a cross-sectional view illustrating the gas removing device of the secondary battery according to the first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery]

Referring to FIG. 1, a secondary battery 10 comprises an electrode assembly 11 having a structure, in which electrodes and separators are alternately stacked, a pouch 12 accommodating the electrode assembly 11, and an electrolyte (not shown) injected into the pouch 12 to be impregnated into the electrode assembly 11. The pouch 12 comprises an accommodation part 12a, in which the electrode assembly 11 and the electrolyte are accommodated, and a gas pocket part 12b collecting a gas generated in the accommodation part 12a.

In the secondary battery 10 having such a configuration, an activation process for improving battery performance is performed. Here, a gas is generated due to an interaction between the electrode assembly and the electrolyte, and the gas is collected in the gas pocket part 12b through the accommodating part 12a.

As described above, the gas collected in the gas pocket part 12b may be discharged to the outside through the gas removing device 100 of the secondary battery according to the first embodiment of the present invention. Particularly, the gas removing device 100 of the secondary battery according to the first embodiment of the present invention may seal a cutoff hole that is cut in order to discharge the gas collected in the gas pocket part 12b, and accordingly, the process may be simplified, and work efficiency may be improved.

Hereinafter, the gas removing device 100 of the secondary battery according to the first embodiment of the present invention will be described in detail with reference to the accompanying drawings.

[Gas Removing Device of Secondary Battery According to First Embodiment of the Present Invention]

As illustrated in FIGS. 1 to 7, the gas removing device 100 of the secondary battery according to the first embodiment of the present invention may seal a gas, through which a gas is discharged, after the gas generated in a pouch is discharged and comprise a pair of vacuum tubes 110, a heating member 120, a cutting member 130, a gas discharging member 140, and a rotating member 150.

Pair of Vacuum Tubes

The pair of vacuum tubes 110 is configured to form a vacuum surface that is in a vacuum state to increase in gas suction power inside the pouch. That is, the pair of vacuum tubes 110 is pressed while being symmetrically disposed on both surfaces of the pouch 12, preferably on both surfaces of the gas pocket part 12b of the pouch 12 to form a vacuum surface 13 that is in a vacuum state in the gas pocket part 12b of the pouch 12 disposed between the pair of vacuum tubes 110.

Hereinafter, for convenience of description, the gas pocket part 12b of the pouch 12 will be referred to as the pouch 12.

Here, the pair of vacuum tubes 110 have the same shape and size and are made of a heat-resistant and insulating material.

Particularly, in the pair of vacuum tubes 110, a pressing surface 111 pressing the pouch 12 to effectively seal an edge of the vacuum surface 13 has a circular ring shape, and also, an accommodation space temporarily accommodating the gas discharged from the pouch is formed at a center of the pressing surface 111, and a cutting member 130 is installed in the accommodation space.

The pair of vacuum tubes 110 having such the structure may stably press both surfaces of the pouch 12, and as a result, the circular vacuum surface 13 may be formed on the surface of the pouch 12.

Heating Member

The heating member 120 is configured to seal the edge of the vacuum surface formed by the pair of vacuum tubes. Particularly, the heating member 120 may seal only a portion of the edge of the vacuum surface 13 before discharging the gas inside the pouch to secure a gas discharge passage through the unsealed portion, and then, after the gas inside the pouch is discharged, the unsealed portion remaining on the edge of the vacuum surface may be sealed to completely finish the gas discharge passage.

That is, the heating member 120 is provided on the pressing surface 111 of the vacuum tube 110 to seal a portion of the edge of the vacuum surface 13 of the pouch 12, which is pressed by the vacuum tube 110, thereby forming a sealed part 12c and an unsealed part 12d on the edge of the vacuum surface 13. That is to say, the edge of the vacuum surface 13 that is in close contact with the heating member 120 is sealed to form the sealed part 12c, and the edge of the vacuum surface 13 that is not in close contact with the heating member 120 is formed as the unsealed part 12d.

Here, two or more heating members 120 are provided on the pressing surface 111 of the vacuum tube 110 to form two or more sealed parts 12c and two or more unsealed parts 12d.

Figure 6:
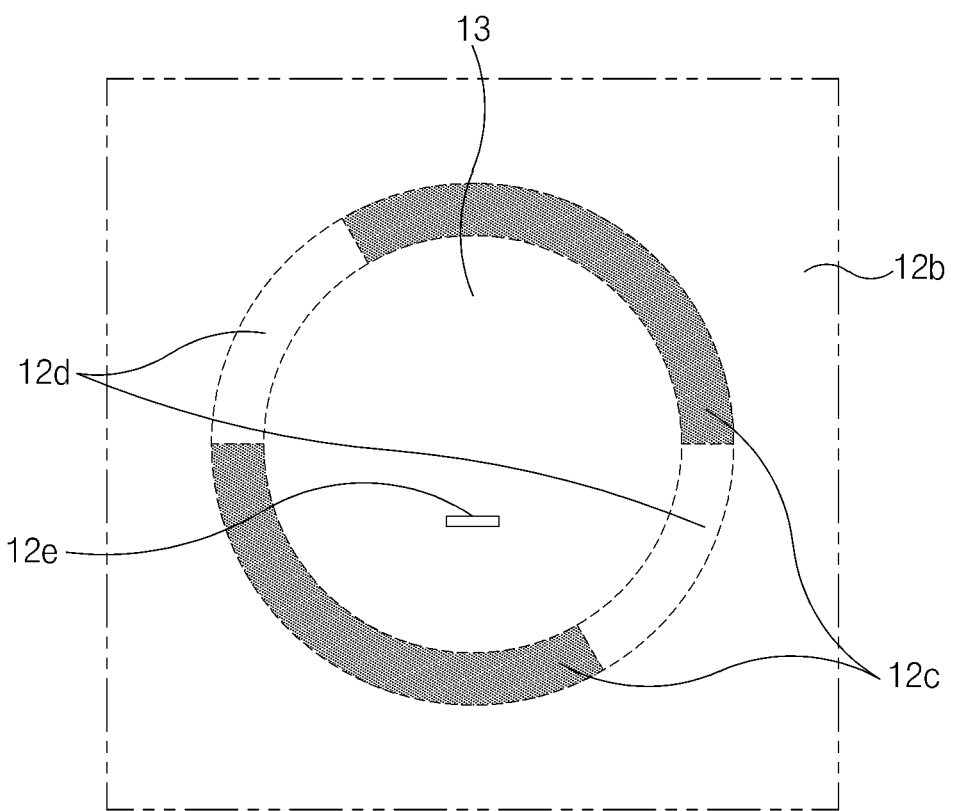
FIG. 6 is a front view illustrating a state in which a sealed part and an unsealed part are formed on an edge of a vacuum surface through the gas removing device of a secondary battery according to the first embodiment of the present invention.

For example, the two heating members 120 are provided on the pressing surface 111 having a ring shape. Here, the two heating members 120 have the same size and shape and are provided symmetrically on both sides of the pressing surface (top and bottom portions of the pressing surface when viewed in FIG. 1) based on a central point of the vacuum tube 110. Referring to FIG. 6, the two heating members 120 having such the structure form a sealed part 12c by sealing each of the upper and lower sides of the edge of the vacuum surface and form the unsealed part 12d at each of left and right sides of the edge of the vacuum surface.

Here, each of the two heating members 120 has an arc angle of 90° or more, preferably 95° or more based on the central point of the vacuum tube 110.

Figure 7:
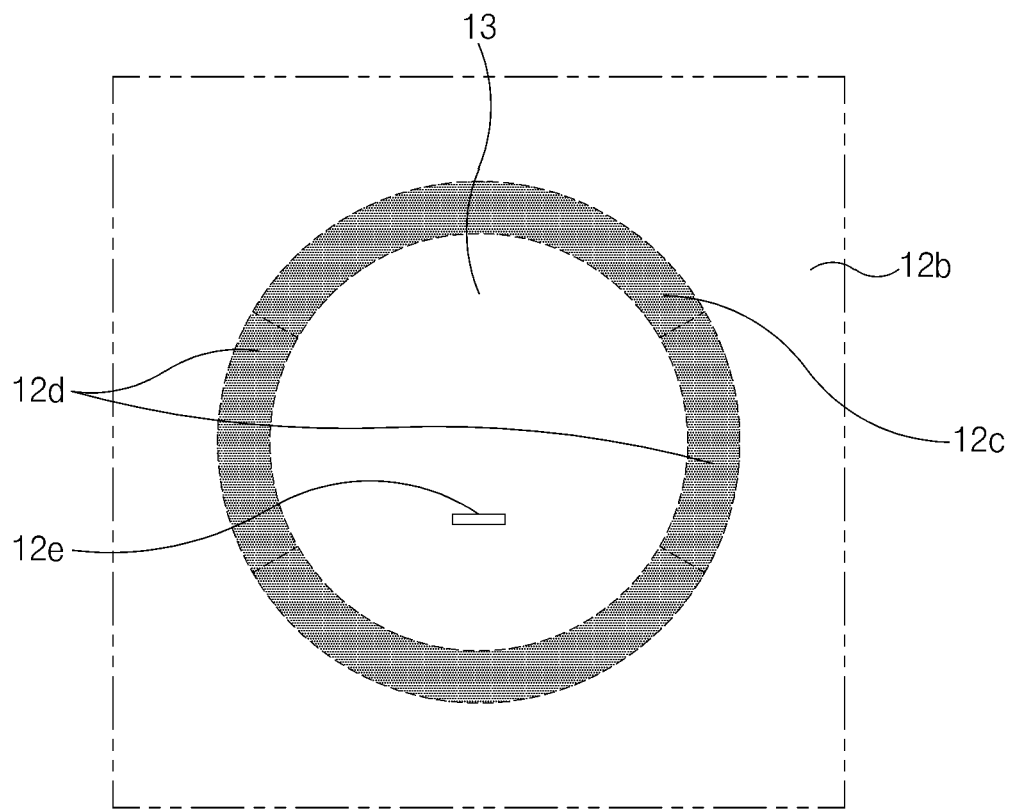
FIG. 7 is a front view illustrating a state in which the entire edge of the vacuum surface of the secondary battery is sealed through the gas removing device of a secondary battery according to the first embodiment of the present invention.
Figure 8:
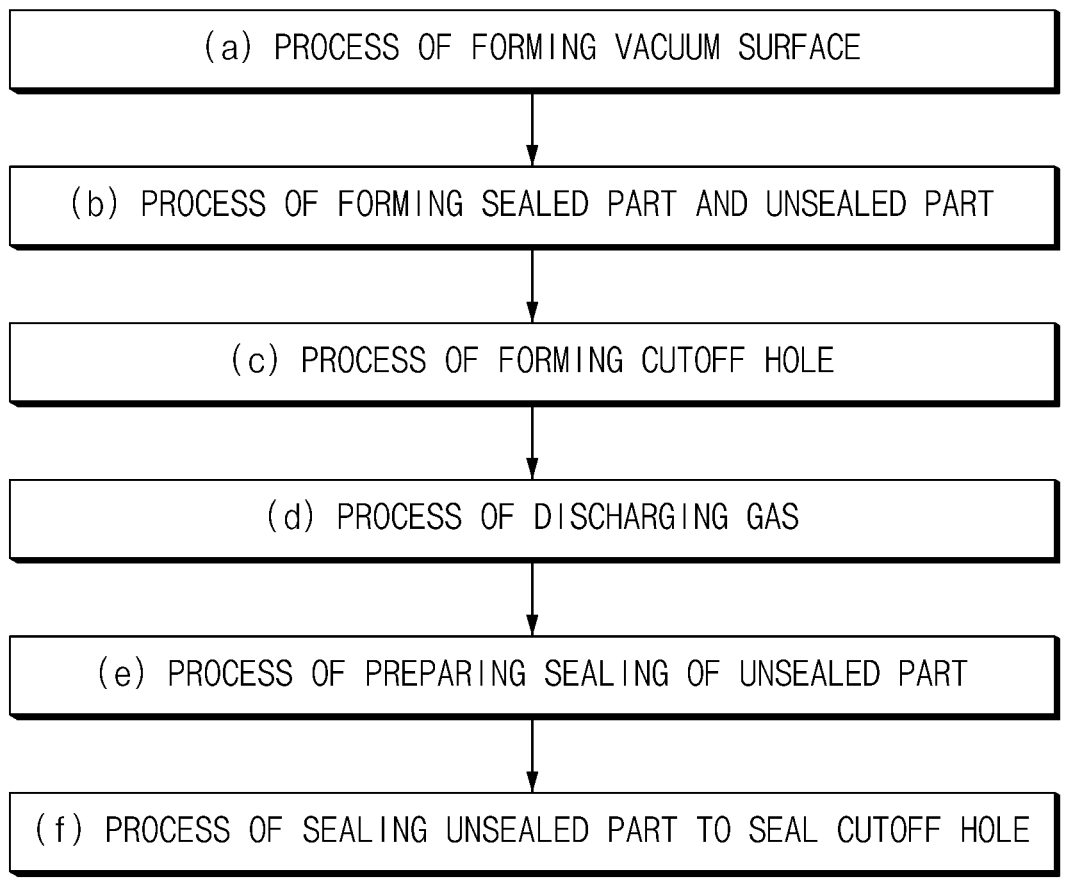
FIG. 8 is a flowchart illustrating a gas removing method of the secondary battery according to the first embodiment.

Thereafter, referring to FIG. 7, the two heating members 120 is rotated at an angle of 90° after the gas is discharged to seal the unsealed part of the edge of the vacuum surface. Thus, the vacuum tube may be rotated once to seal the entire edge of the vacuum surface.

Therefore, the heating member 120 may prevent the pouch from being unnecessarily deformed when the gas inside the pouch is discharged through suction force by forming the sealed part on the vacuum surface and may form the unsealed part on the vacuum surface to secure a passage through which the gas inside the pouch is discharged.

The arc angle formed by combining the two or more heating members 120 provided on the pressing surface of the vacuum tube 110 may be 180° or more with respect to the central point of the vacuum tube 110. Thus, it is possible to seal the unsealed part 12d through the two or more heating members 120 only by rotating the vacuum tube 110 once.

Here, when the arc angle formed by combining the two or more heating members 120 is 180° or less with respect to the central point of the vacuum tube 110, the vacuum tube has to be rotated twice or more to seal the entire edge of the vacuum surface, and thus, the work efficiency may be deteriorated.

Preferably, the arc angle formed by combining the two or more heating members 120 may range of 185° to 200° with respect to the central point of the vacuum tube 110, and accordingly, when sealing the edge of the vacuum surface two times, portions may be sealed to overlap each other, thereby significantly preventing sealing failure from occurring. Here, when the arc angle formed by combining the two or more heating members 120 may be 200° or more, the edge of the vacuum surface may be sealed two times, but the overlapping portions may be significantly reduced to deteriorate the work efficiency.

The heat insulator 160 is provided on the pressing surface 111 of the vacuum tube 110 between the two or more heating members 120. The heat insulator 160 may block heat of the heating member 120 so as not to be transferred to the unsealed part 12d, thereby preventing a portion of the unsealed part 12d from being sealed. Particularly, the insulating material 160 is made of a synthetic resin having heat resistance and elasticity to elastically press the unsealed part of the vacuum surface, thereby preventing the unsealed part from being deformed while being excessively inflated during the gas discharge.

The heating member may heat the surface of the pouch at a temperature of 140° C. to 200° C. for 0.1 seconds to 1 second under a pressure of 0.1 Mpa to 0.5 MPa.

The heating member 120 may be a heating device that generates heat when power is applied.

Cutting Member

The cutting member 130 is configured to form a cutoff hole for the gas discharge in the vacuum surface. The cutting member 130 is provided inside one vacuum tube 110 of the pair of vacuum tubes 110 and comprises a cutting blade that is withdrawn out to pass through the vacuum surface 13 when the power is applied. The cutting blade returns to its original position when the power is cut off.

That is, the cutting member 130 forms a cutoff hole 12e in the vacuum surface 13 as the cutting blade passes through the vacuum surface 13.

Gas Discharging Member

The gas discharging member 140 generates the suction force so that the gas inside the pouch is discharged. As the gas discharging member 140 is mounted on the pair of vacuum tubes 110 to discharge the air inside the vacuum tube 110 to the outside, thereby discharging the gas inside the pouch to the outside through the unsealed part 12d, the cutoff hole 12e, and the inside of the vacuum tube 110 by the suction force generated between the pair of vacuum tubes 110.

Rotating Member

The rotating member 150 is configured to rotate the vacuum tube so as to allow the heating member to seal the unsealed part of the vacuum surface so that the heating member is disposed on the unsealed part of the vacuum surface.

That is, the rotating member 150 comprises a main body to which the vacuum tube is rotatably coupled and a driving motor 151 that rotates the vacuum tube coupled to the main body. Here, the driving motor 151 may be engaged with a gear formed on the vacuum tube 110 to rotate the vacuum tube 110 and thus move the heating member 120 provided on the vacuum tube 110 from the sealed part 12c to the unsealed part 12d.

Thus, in the gas removing device 100 of the secondary battery, which has the above-described configuration, according to the first embodiment of the present invention, the vacuum surface may be formed on the pouch through the pair of vacuum tubes 110, a portion of the vacuum surface may be sealed through the heating member 120 to form the sealed part and the unsealed part, the cutoff hole may be formed in the vacuum surface through the cutting member 130, the gas inside the pouch may be discharged to the outside through the gas discharging member 140, and the heating member 120 may be disposed on the unsealed part through the rotating member 150 to seal the unsealed part and thus seal the cutoff hole.

As a result, the gas removing device 100 of the secondary battery according to the first embodiment of the present invention may discharge the gas inside the pouch and seal the cutoff hole, through which the gas is discharged, thereby the efficiency of the operation and the simplification of the process.

Hereinafter, a gas removing method using the gas removing device 100 of the secondary battery according to the first embodiment of the present invention will be described.

[Gas Removing Method of Secondary Battery According to First Embodiment of the Present Invention]

The gas removing method of the secondary battery according to the first embodiment of the present invention is performed to remove the gas generated inside the pouch in which the electrode assembly is accommodated. That is, as illustrated in FIGS. 8 to 13, the gas removing method of the secondary battery according to the first embodiment of the present invention comprises a process (a) of forming a vacuum surface, a process (b) of forming a sealed part and an unsealed part, a process (c) of forming a cutoff hole, a process (d) of discharging a gas, a process (e) of preparing the sealing of the unsealed part, and a process (f) of sealing the cutoff hole to seal the unsealed part.

Process (a)

Figure 9:
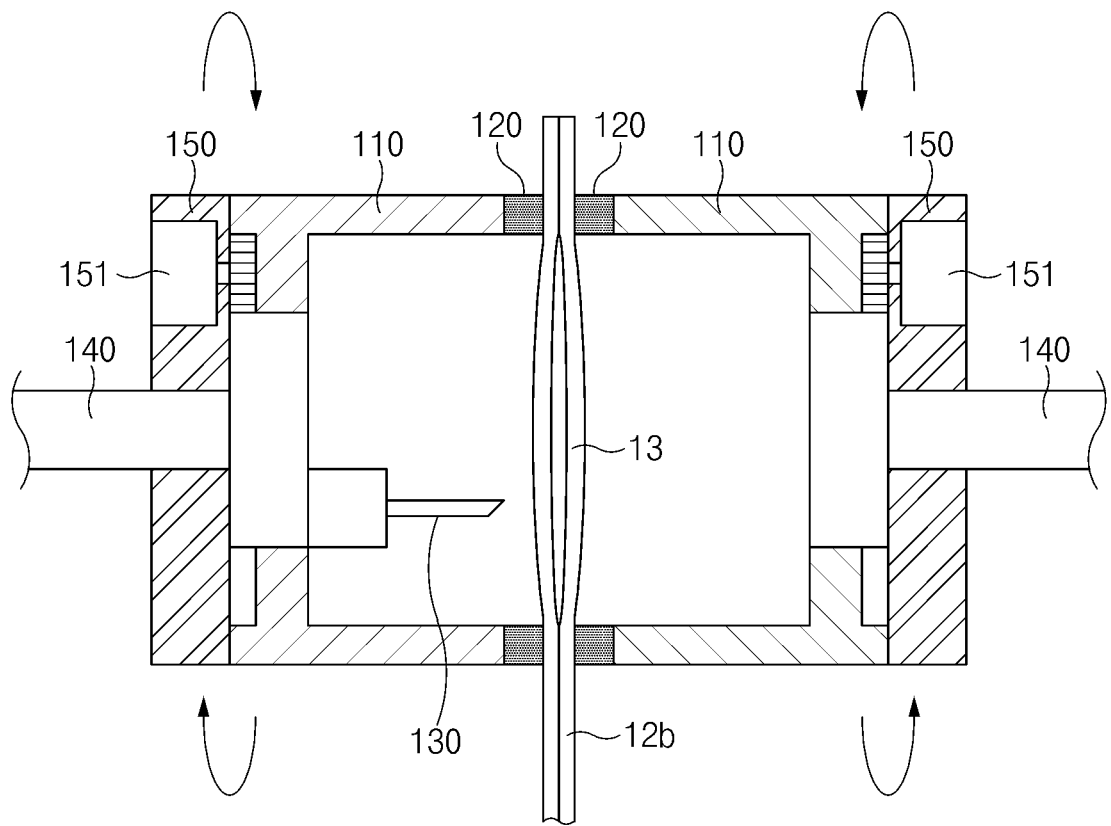
FIG. 9 is a cross-sectional view illustrating a process (a) in the gas removing method of the secondary battery according to the first embodiment.

Referring to FIG. 9, the process (a) is performed to form the vacuum surface in a gas pocket part of a pouch. Here, a pair of vacuum tubes 110 are symmetrically disposed on both surfaces of the gas pocket part 12b of the pouch 12, and then, the gas pocket part 12b is pressed. Thus, a vacuum surface 13 that is in a vacuum state may be formed on the gas pocket part 12b disposed between the pair of vacuum tubes 110.

Two or more heating members 120 and two or more heat insulators 160 are alternately provided on the pressing surfaces 111 of the pair of vacuum tubes 110 that press the gas pocket part 12b, and the heating member 120 and the heat insulator 160 are in close contact with the gas pocket part 12b.

Process (b)

Figure 10:
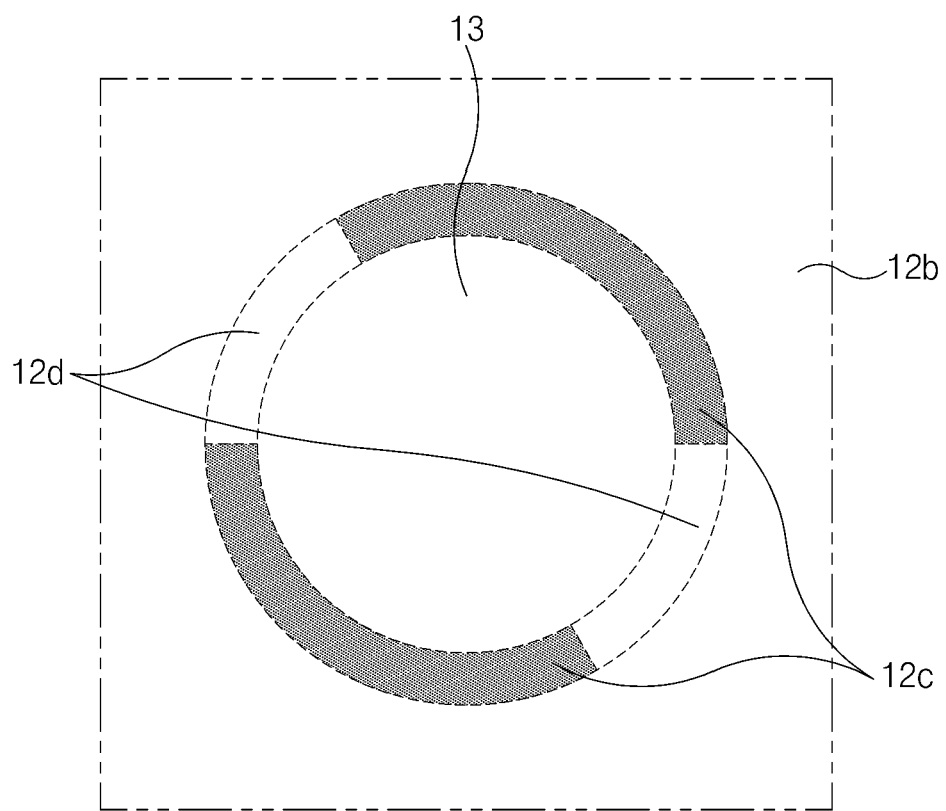
FIG. 10 is a front view illustrating a process (b) in the gas removing method of the secondary battery according to the first embodiment.

In the process (b), referring to FIG. 10, a portion of an edge of the vacuum surface may be sealed through the heating member 120 provided on the pressing surface of the vacuum tube 110 to form a sealed part 12c and an unsealed part 12d.

That is, in the process (b), two or more sealed parts 12c and two or more unsealed parts 12d are formed on the edge of the vacuum surface 13 through two or more heating members 120 provided on the pressing surface 111 of the vacuum tube 110.

Here, an arc angle formed by combining the two or more heating members may be 180° or more based on a central point of the vacuum tube, and accordingly, the sealed part having the combined circular arc angle that is 180° or more may be formed on the edge of the vacuum surface 13. The unsealed part has an arc angle excluding the arc angle of the sealed part at an angle of 360°.

Process (c)

Figure 11:
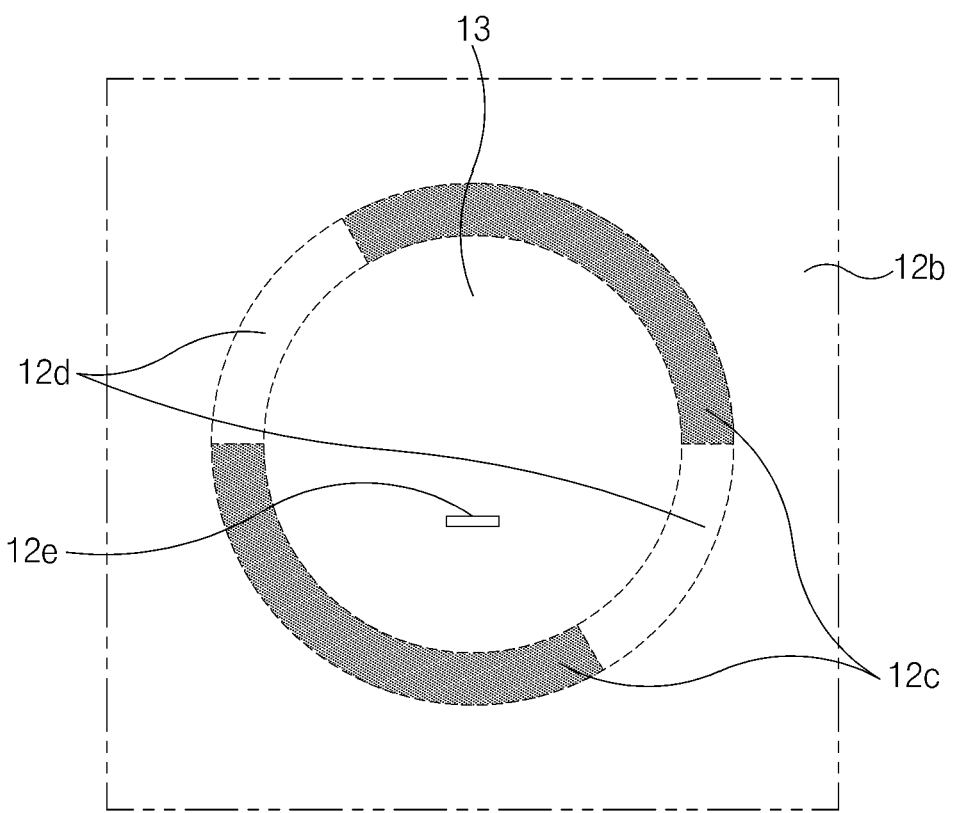
FIG. 11 is a front view illustrating a process (c) in the gas removing method of the secondary battery according to the first embodiment.

In the process (c), referring to FIG. 11, the vacuum surface 13 is cut through the cutting member 130 provided inside one vacuum tube 110 to form a cutoff hole 12e.

That is, while a cutting blade provided in the cutting member 130 passes through the vacuum surface 13 to form a cutoff hole 12e in the vacuum surface 13. Then, the cutting blade returns to its original position.

Process (d)

Figure 12:
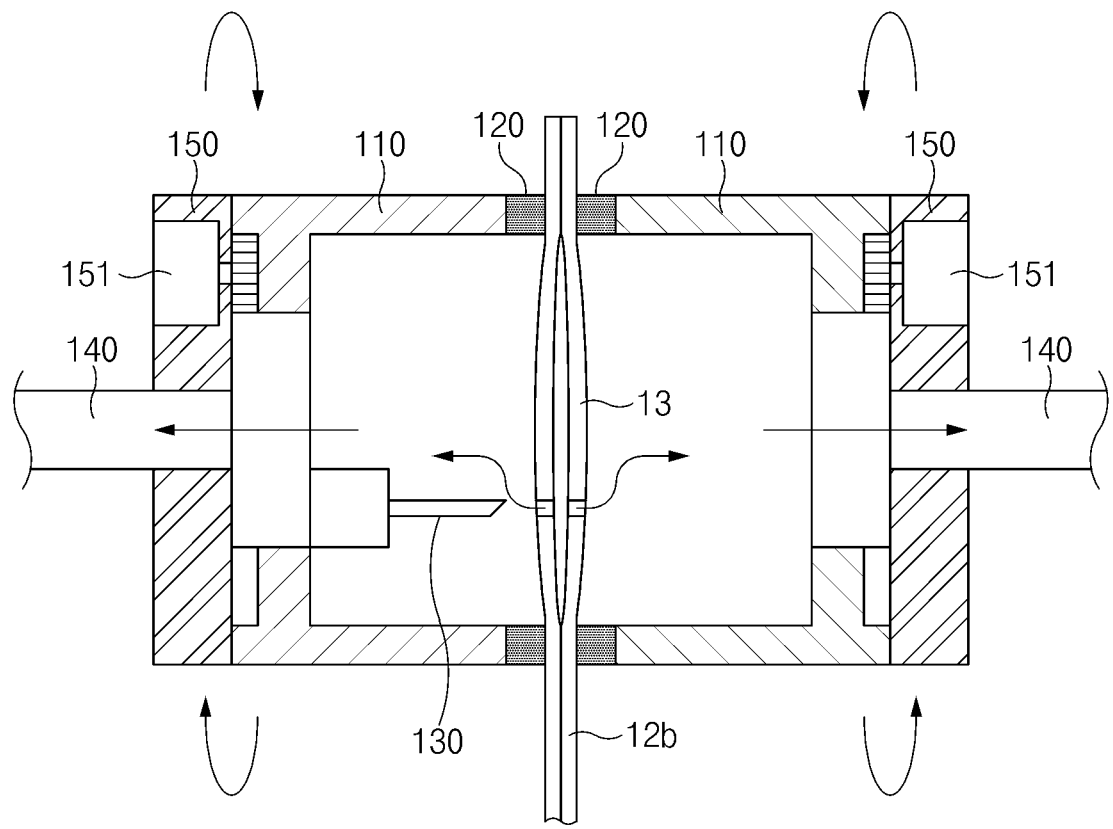
FIG. 12 is a cross-sectional view illustrating a process (d) in the gas removing method of the secondary battery according to the first embodiment.

In the process (d), referring to FIG. 12, when air inside the vacuum tube 110 is discharged through a gas discharging member 140, suction force may be generated inside the vacuum tube 110, and a gas inside the gas pocket part 12b may be discharged to the outside through the unsealed part 12d, the cutoff hole 12e, and the inside of the vacuum tube 110.

Process (e)

Figure 13:
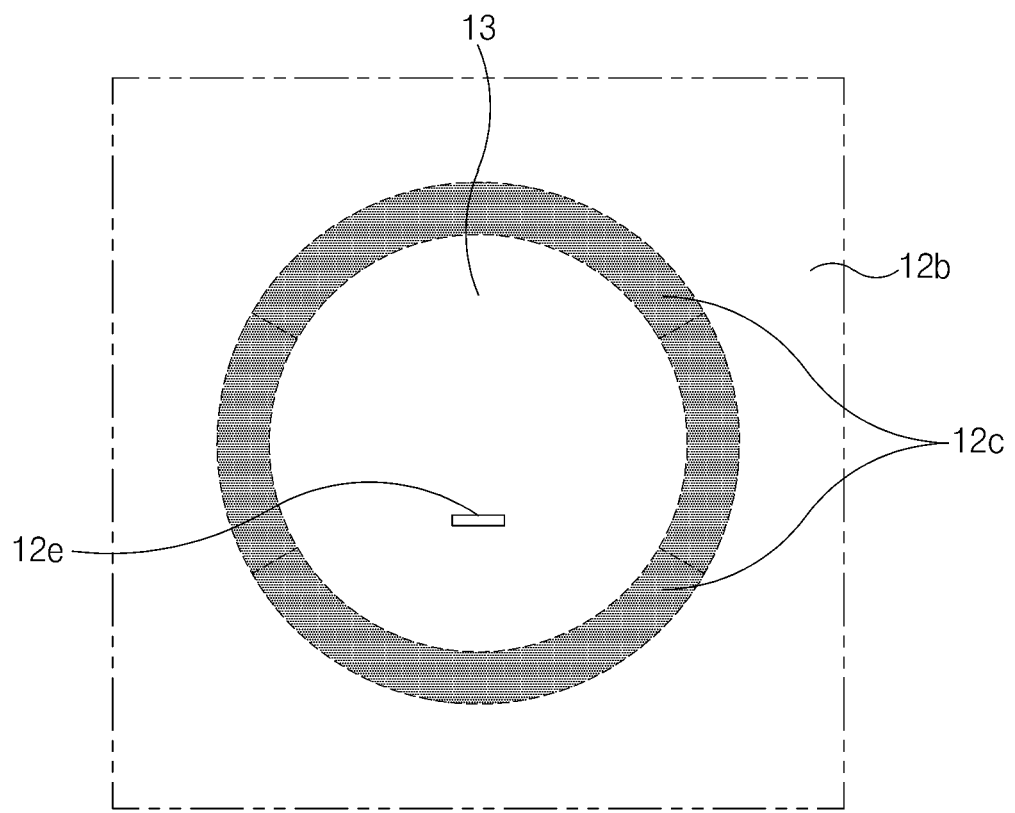
FIG. 13 is a front view illustrating a process (e) and a process (f) in the gas removing method of the secondary battery according to the first embodiment.

In the process (e), referring to FIG. 13, the pair of vacuum tubes 110 that are in close contact with the pouch 12 are simultaneously rotated through a rotating member 150. Then, the heating member 120 may be rotated by being interlocked with the vacuum tubes 110, and accordingly, the heating member 120 may be disposed on the unsealed part 12d of an edge of the vacuum surface 13.

In the process (e), the rotating member 150 rotates the vacuum tube at an angle of 90° to locate the heating member on the unsealed part. Here, both ends of the heating member are disposed to partially overlap the sealed part disposed on each of both sides of the unsealed part.

Process (f)

In the process (f), the unsealed part 12d is sealed through the heating member 120. Thus, the entire edge of the vacuum surface 13 may be sealed to seal the cutoff hole 12e.

Therefore, in the gas removing method of the secondary battery according to the first embodiment of the present invention, when the process (f) is completed, the gas generated inside the pouch may be completely discharged.

Hereinafter, in descriptions of another embodiment of the present invention, constituents having the same function as the above-mentioned embodiment have been given the same reference numeral in the drawings, and thus duplicated description will be omitted.

[Gas Removing Device of Secondary Battery According to Second Embodiment of the Present Invention]

Figure 14:
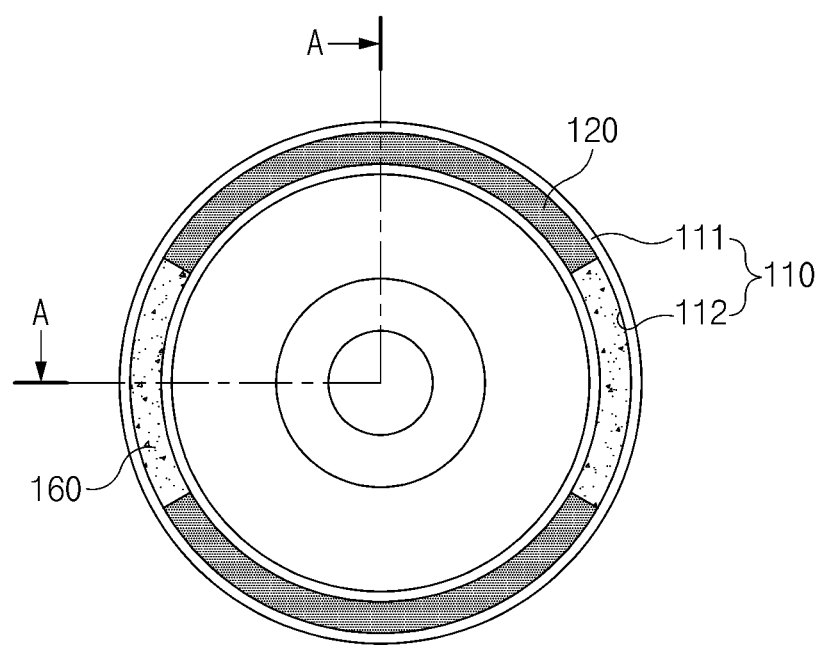
FIG. 14 is a front view illustrating a gas removing device of a secondary battery according to a second embodiment of the present invention.
Figure 15:
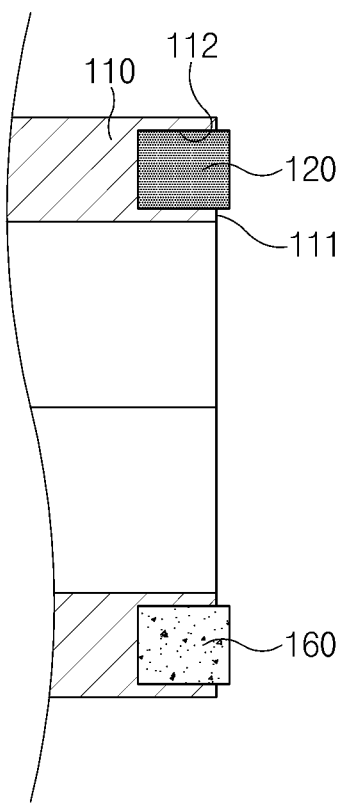
FIG. 15 is a cross-sectional view taken along line A-A of FIG. 14.

As illustrated in FIGS. 14 and 15, a gas removing device 100 of a secondary battery according to a second embodiment of the present invention comprises a vacuum tube 110, a heating member 120 provided on a pressing surface of the vacuum tube 110, and a heat insulator 160.

Here, an insertion groove 112 is formed in the pressing surface 111 of the vacuum tube 110, and the heating member 120 and the heat insulator 160 are inserted into the insertion groove 112. Thus, fixing force between the heating member 120 and the heat insulator 160 may greatly increase.

Each of the heating member 120 and the heat insulator 160 may have the same height as the pressing surface 111. Thus, it is possible to stably protect the heating member 120 and the heat insulator 160 from the outside.

In addition, the heating member 120 and the heat insulator 160 may be provided to protrude by a predetermined height from the pressing surface 111. Thus, the heating member 120 and the heat insulator 160 may be stably attached to the edge of the vacuum surface.

The insertion groove 112 has a ring-shaped structure in which both ends are connected while being formed along the ring-shaped pressing surface 111, and two or more heating members 120 and two or more insulators 160 are alternately inserted. Thus, the two or more heating members 120 and the two or more heat insulators 160 may be easily inserted, and their positions may be selectively adjusted.

The heating member 120 and the heat insulator 160 may be detachably inserted into the insertion groove 112 to improve the ease of maintenance.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

10: Secondary battery
11: Electrode assembly
12: Pouch
12a: Accommodation part
12b: Gas pocket part
12c: Sealing part
12d: Unsealed part
12e: Cutoff hole
13: Vacuum surface
100: Gas removing device of secondary battery
110: Vacuum tube
111: Pressing surface
112: Insertion groove
120: Heating member
130: Cutting member
140: Gas discharging member
150: Rotating member
151: Driving motor
160: Insulator

The invention claimed is:

1. A gas removing device, which removes a gas generated inside a pouch, in which an electrode assembly is accommodated, the gas removing device comprising:
a pair of vacuum tubes configured to symmetrically press opposing surfaces of a pouch so as to form a vacuum surface, which is in a vacuum state, on the pouch;
a heating member provided on a pressing surface of each of the pair of vacuum tubes, which presses the pouch, is configured to seal only a portion of an edge of the vacuum surface so as to form a sealed part and an unsealed part;
a cutting member configured to cut the vacuum surface of the pouch and form a cutoff hole;
a gas discharging member configured to discharge a gas from inside the pouch to outside the pouch through the unsealed part, the cutoff hole, and the pair of vacuum tubes, wherein each heating member includes two or more of the heating members such that the sealed part includes two or more of the sealed parts and the unsealed part includes two or more of the unsealed parts on the edge of the vacuum surface, and
an insulator configured to block heat of the heating member so as not to be transferred to the unsealed part is provided on the pressing surface of each vacuum tube disposed between the two or more of the heating members of each heating member.

2. The gas removing device of claim 1, wherein an arc angle formed by combining the two or more of the heating members of each heating member is 180° or more based on a central point of each vacuum tube.

3. The gas removing device of claim 1, wherein the two or more of the heating members of each heating member are symmetrically provided on the pressing surface based on a central point of each vacuum tube, and
each of the two or more heating members of each heating member has an arc angle of 90° or more based on the central point of each vacuum tube.

4. The gas removing device of claim 1, wherein the pressing surface of each of the vacuum tubes defines an insertion groove to receive the heating member and the insulator.

5. The gas removing device of claim 4, wherein the pressing surface of each vacuum tube has a ring shape,
the insertion groove is formed along the pressing surface so that each of both ends of the insertion groove is ring shaped, and
the heating member and the insulator are inserted to be alternately disposed in the insertion groove having the ring shape.

6. The gas removing device of claim 5, wherein the heating member and the insulator are configured to be detachably attached to the insertion groove.

7. The gas removing device of claim 1, further comprising a rotating member configured to rotate the pair of vacuum tubes so that the heating member provided in each of the pair of vacuum tubes is disposed on the unsealed part, the rotating member including a body couple rotatably coupled to the pair of vacuum tubes.

8. The gas removing device of claim 7, wherein the heating member disposed on the unsealed part is provided to seal the unsealed part so as to seal the cutoff hole.

9. A gas removing method of a secondary battery, in which a gas generated inside a pouch, in which an electrode assembly is accommodated, is removed, the gas removing method comprising the steps of:
(a) symmetrically pressing opposing surfaces of the pouch using a pair of vacuum tubes to form a vacuum surface, which is in a vacuum state, on a surface of the pouch;
(b) sealing only a portion of an edge of a vacuum surface through a heating member provided on a pressing surface of each of the vacuum tubes, the heating member configured to form two or more sealed parts and two or more unsealed parts on the edge of the vacuum surface, wherein an insulator disposed between the heating member on the pressing surface of each vacuum tube prevents heat transfer to the unsealed parts;
(c) cutting the vacuum surface of the pouch by using a cutting member to form a cutoff hole; and
(d) discharging a gas inside the pouch through a gas discharge member to outside the pouch through the unsealed parts, the cutoff hole, and the pair of vacuum tubes.

10. The gas removing method of claim 9, wherein, in the step (b), an arc angle formed by combining the two or more of the heating members is equal to or greater than 180° based a central point of each vacuum tube to form the two or more of the sealed parts having a combined arc angle of 180° or more on the edge of the vacuum surface.

11. The gas removing method of claim 9, further comprising, after the step (d), a step (e) of rotating at least one vacuum tube through a rotating member so that the heating member provided on each vacuum tube is disposed on the unsealed part; and a step (f) of sealing the unsealed part using the heating member to seal the cutoff hole.

12. The gas removing method of claim 11, wherein, in the step (e), both ends of the heating member disposed on the unsealed part are disposed to partially overlap the two or more of the sealed parts disposed on both sides of the unsealed part.

\* \* \* \* \*